United States Patent [19]

Rabl

[11] Patent Number: 5,154,163

[45] Date of Patent: Oct. 13, 1992

[54] RADIATION CONCENTRATOR DEVICE

[75] Inventor: Ari Rabl, Montgeron, France

[73] Assignee: A.R.M.I.N.E.S., Paris, France

[21] Appl. No.: 752,590

[22] PCT Filed: Dec. 24, 1990

[86] PCT No.: PCT/FR90/00943

§ 371 Date: Nov. 1, 1991

§ 102(e) Date: Nov. 1, 1991

[87] PCT Pub. No.: WO91/10103

PCT Pub. Date: Jul. 11, 1991

[30] Foreign Application Priority Data

Jan. 2, 1990 [FR] France .................... 90 00014

[51] Int. Cl.[5] .................................................. F24J 2/18
[52] U.S. Cl. ........................................................ 126/439
[58] Field of Search ........................... 126/439; 134/246

[56] References Cited

U.S. PATENT DOCUMENTS 4,327,969  5/1982  Giutronich et al.
4,505,260  3/1985  Metzger ............................... 126/439

FOREIGN PATENT DOCUMENTS 2033103  5/1980  United Kingdom .

OTHER PUBLICATIONS

Winston et al., Applied Optics, vol. 19, No. 3, Feb. 1980, Design of Non-Imaging Concentrators As Second Stages In Tandem With Image-Forming First Stage Concentrators, pp. 347-351.

Kritchman, Applied Optics, vol. 21, No. 5, Mar. 1982, Asymmetric Second Stage Concentrators, pp. 870-873.

Winston et al., N.T.I.S. Technical Notes, No. 10, Part C, Oct. 1984, Two-Stage Off-Axis Cylindrical Solar Concentrator, p. 774.

Bassett et al., Optical and Quantum Electronics, vol. 10, No. 1, Jan. 1978, The Collection of Diffuse Light Onto An Extended Absorber, pp. 61-82.

Mills et al., Solar Energy, vol. 20, No. 1, 1978, Asymmetrical Non-Imaging Cylindrical Solar Concentrators, pp. 45-55.

*Primary Examiner*—Carroll B. Dority
*Attorney, Agent, or Firm*—Sandler, Greenblum & Bernstein

[57] ABSTRACT

A device for focusing parallel rays on a receiving element (20). The device is characterized in that it comprises at least one focusing element on either side of a principal plane, each said element comprising a cylindrical primary reflector the base of which consists of a parabolic curve (AA') and which is offset by a certain distance (d) with respect to the principal plane on the side of the parabolic curve (A,A'), and a secondary reflector consisting of two cylindrical elements (BCD, B'C'D'), the base of which is made up of at least one generalized involute curve (BC, B'C'), each of these curves ending with an upstream end (B,B') determining a straight segment (BB') on which is positioned the focal point (F) of the parabolic curve (AA') forming the base of the primary reflector (24), as well as a downstream end (C,C'), the focal point of each generalized involute curve (BC and B'C') consisting respectively of the end (A',A) of the parabolic curve (AA') which faces its concave portion.

12 Claims, 5 Drawing Sheets

RADIATION CONCENTRATOR DEVICE

BACKGROUND OF THE INVENTION

The present invention relates to a radiation concentrator, particularly for solar power station.

Such radiation concentrators for solar power station are known, essentially constituted by cylindrical reflectors with a parabolic base which concentrate the sun's rays on cylindrical tubes of circular section, disposed at the focus of the parabola and whose generatrices are parallel to those of the reflector, these tubes being passed through by a heat-transfer fluid. These concentrators present the advantage of allowing the production of parabolic reflectors with a large angular aperture which make it possible to dispose the heat-transfer tube near the center of gravity of the reflector, which promotes the mechanical resistance of the assembly of the concentrator and allows the concentrator to pivot about its center of gravity, minimizing the relative displacements of the heat-transfer tube, which simplifies the problems of tightness thereof.

Such concentrators present a relatively weak concentration and this is why it has been proposed to add to the parabolic reflector a so-called "CPC" type reflector, i.e. a reflector constituted by two cylindrical elements of which the elliptic base is symmetrical with respect to a central axis and of which one of the foci is constituted by the downstream end of the reflector element which is symmetrical thereto with respect to the central axis, and the other focus is constituted by the intersection of the straight line joining the downstream end of this element to the upstream end of the other element with the parabolic reflector opposite the tube conveying the heat transfer fluid.

However, in such concentrators, the increase in concentration furnished by the CPC is significantly manifested only for parabolic reflectors of small angular aperture, so that the manufacturers of collectors have preferred, for the reasons mentioned above, to employ cylindrical collectors associated with simple parabolic reflectors despite the relatively low concentration resulting therefrom.

SUMMARY OF THE INVENTION

It is an object of the present invention to overcome these drawbacks by proposing a novel type of association of parabolic reflectors and reflectors of CPC type.

The present invention thus has for an object a concentrator device intended for effecting concentration of substantially parallel radiations on a receiver element, this device being constituted by cylindrical elements symmetrical with respect to a plane P of the same direction as the radiations, characterized in that it comprises, on each side of the plane of symmetry P, at least one concentrator element, each concentrator element comprising a principal cylindrical reflector whose base is constituted by an arc of parabola AA', of which the axis zz' is parallel to the direction of the radiations and is offset by a distance d with respect to the plane of symmetry P on the side of the arc of parabola A,A', and a secondary reflector, constituted by two cylindrical elements B C D, B' C' D', and whose base is constituted by at least one arc of generalized involute BC,B'C' of the outer surface of the receiver element, whose concavities face each other, each of these arcs terminating in an upstream end B,B' determining a segment of straight line BB' on which is positioned the focus F of the arc of parabola AA' constituting the base of the principal reflector, and a downstream end C,C', the focus of each of the arcs of generalized involute BD and B'D' being respectively constituted by the end A',A of the arc of parabola AA' facing its concavity.

The concentrator according to the invention makes it possible notably to improve the concentration in a ratio of about 2.5.

Moreover, the concentrator according to the invention makes it possible to attain large angles of aperture, able to attain 120°, without noteworthy loss of concentration.

In fact, it is known that, to obtain an optimum yield of a concentrator, it must be considered that the sun's rays are not all parallel, and that rays deviating by an angle $\delta$ from the general direction thereof must also be reflected by the concentrator on the receiver element.

A theoretical limit of the concentration equal to $C_{max} = 1/\sin \delta$ is thus defined.

Now, in a concentrator of conventional type, i.e. constituted by a cylindrical element whose base is constituted by an arc of parabola, the concentration is defined by the relation:

$$C = \frac{2X_A}{2\pi r} = \frac{\sin \phi}{\pi} \times \frac{1}{\delta} = \frac{\sin \phi}{\pi} \times C_{max} \quad (1)$$

where:

$X_A$ represents the distance from the extreme point A of the parabola to the axis thereof.

r represents the radius of the circular base of a cylindrical tube constituting the receiver element conveying the heat-transfer fluid, and on which the radiations are concentrated.

$\phi$ represents the angle of aperture of the arc of parabola, i.e. the angle formed by the extreme edge thereof with the axis of symmetry.

The maximum concentration capable of being furnished by this type of concentrator can therefore represent, in the best of cases, i.e. when the angle of aperture $\phi = 90°$, only a value equal to $1/\pi$ viz. 32% of the theoretical maximum concentration $C_{max}$.

As described hereinafter, the present invention makes it possible to attain a relative concentration (i.e. the ratio of the concentration of the concentrator with respect to the theoretical maximum concentration $C_{max}$ multiplied by 100) of 90% with angles of aperture $\phi$ of parabola of 90°.

Moreover, the present invention makes it possible, even in the case of larger angles of aperture $\phi$ of parabola, to maintain the concentration furnished by the concentrator at interesting values.

Thus, for an angle of aperture $\phi$ of 120°, a concentrator according to the invention may furnish a concentration of 78%.

In an interesting variant of the invention, it is possible to assimilate a generalized involute of circle with an ellipse insofar as the receiver element presents a plane exchange surface, and it will thus be interesting to employ cylindrical secondary reflectors whose base is elliptic in form.

The term generalized involute of a convex curve will designate in the following description a curve such that, at any point (M) thereof, the straight line symmetrical to the tangent to the convex curve issuing from point M, with respect to the perpendicular to the tangent to the curve at point M, passes through a fixed point or focus.

BRIEF DESCRIPTION OF THE DRAWINGS

Various embodiments of the present invention will be described hereinafter with reference to the accompanying drawings, in which.

DETAILED DESCRIPTION OF THE PREFERRED EMBODIMENTS

In the different embodiments of the invention described hereinafter, the concentrator is constituted by two systems of reflectors, symmetrical with respect to a plane P, and only one system of reflectors located on the same side of this plane P will be described hereinafter in detail.

Figure 1:
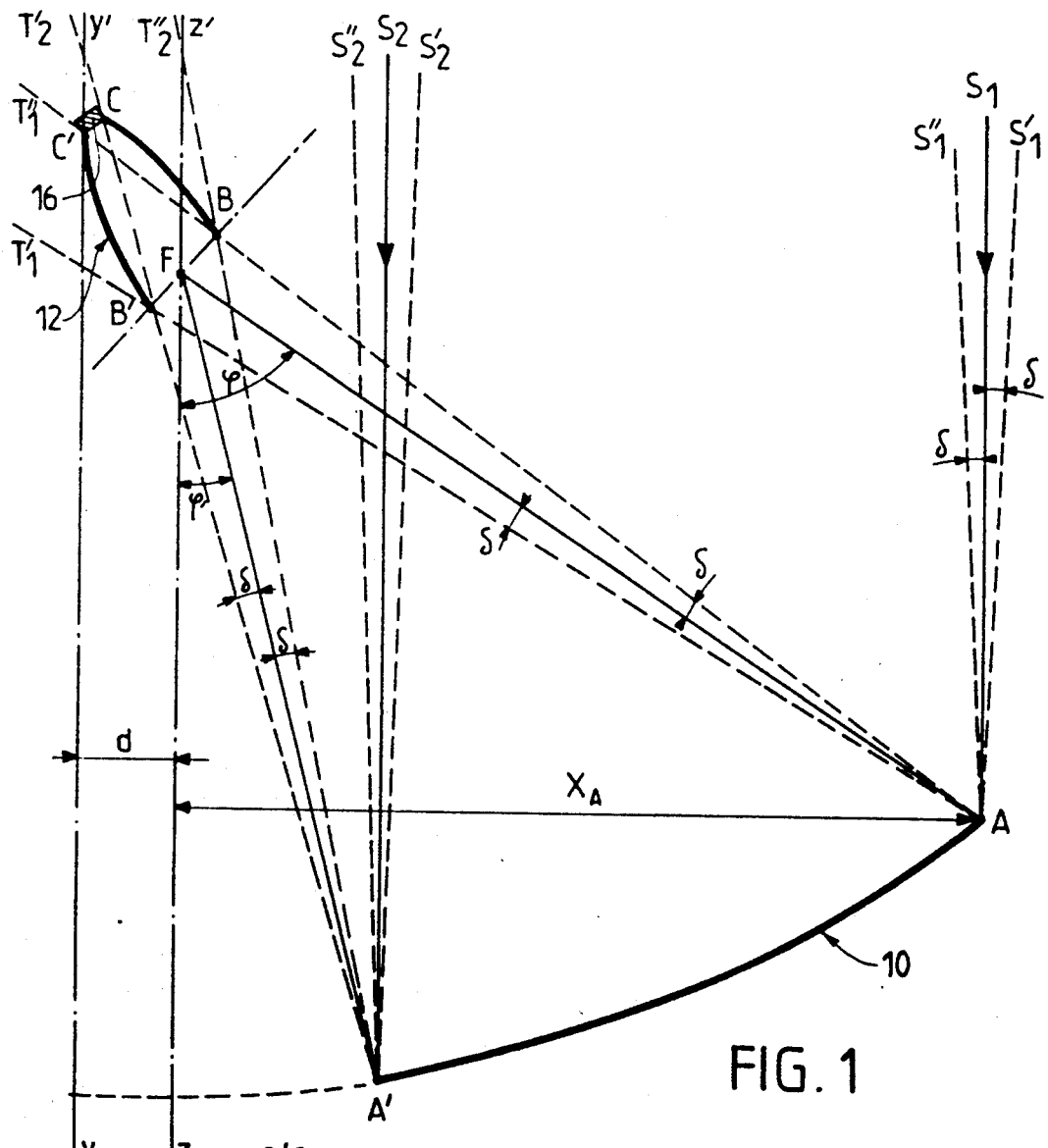
FIG. 1 is a half-view in vertical and transverse section of a concentrator according to the invention employing a parallelepipedic receiver element.

In FIG. 1, a half-concentrator according to the invention is thus essentially composed of two cylindrical reflectors, namely a principal reflector 10 whose base is constituted by an arc of parabola AA′, with axis zz′ parallel to the axis of symmetry yy′ contained in the plane P and representing, as shown in FIG. 1, the axis of symmetry of the concentrator, and a secondary reflector 12, of "CPC" type, whose base is constituted by two arcs of generalized involute namely BC and B′C′.

In this first embodiment of the invention, the receiver element 16 presents a rectangular exchange surface whose base is constituted by segment CC′. Under these conditions, the generalized involutes are constituted by two arcs of ellipse BC and B′C′ respectively. The concentrator is oriented so that the sun's rays are parallel to its axis of symmetry yy′.

Axis zz′ of the arc of parabola AA′ is offset outwardly, with respect to the axis of symmetry yy′ of the concentrator, by a value d. The parallel rays issuing from the sun $S_1$ and $S_2$ reflecting respectively at the two ends A and A′ of the arc of parabola AA′ intersect at focus F thereof.

As set forth hereinabove, the sun's rays $S'_1$, $S''_1$ and $S'_2$, $S''_2$ deviating respectively by an angle on either side of the parallel rays $S_1$ and $S_2$ reflect respectively at A and A′ along rays $AT'_1$ and $AT''_1$ on the one hand and $A'T'_2$ and $A'T''_2$ on the other hand.

Consequently, all the incident rays which are contained in angle $S''_1 AS'_1$ are reflected at A on the arc of parabola AA′ and emerge therefrom within an angle $T''_1 A T'_1$, and the incident solar rays contained in angle $S''_2 A'S'_2$ are reflected at A′ on the arc of parabola AA′ and emerge therefrom within an angle $T''_2 A' T'_2$. The intersection of these two angles thus defines a segment BB′ base of the focal plane of the principal parabolic reflector, within which pass all the sun's rays reflected by the arc of parabola AA′, and substantially at the center of which is disposed the focus F of the arc of parabola AA′.

To concentrate these rays, a cylindrical reflector of CPC type is used, with respect to which the segment BB′ performs the role of virtual object, which is constituted by two cylindrical elements whose base is made of the two arcs of ellipse BC and B′C′.

The respective foci C′,A′ and C,A of each of the arcs of ellipse BC and B′C′ are constituted on the one hand by the downstream end of the other arc of ellipse, respectively C′ and C, and by the intersection of the straight line joining respectively the downstream end C,C′ of this arc of ellipse BC,B′C′ to the upstream end B′,B of the other arc of ellipse B′C′,BC with the arc of parabola AA′. In this way, the arc of ellipse BC has for foci points C′ and A′ and the arc of ellipse B′C′ has for foci points C and A.

According to a feature particular to the reflectors of "CPC" type, all the rays penetrating inside the latter pass through a plane surface of which one side is constituted by a generatrix of the cylinder constituting the CPC reflector and the other side by the segment CC′, without there being any rays captive between the elements constituting the walls of the CPC reflector.

In fact, if the extreme rays are considered, namely on the one hand the rays emerging from $S'1$ reflecting at A, these rays arrive at B′ and are reflected on the arc of ellipse B′C′ along a radius B′C, and similarly, the opposite extreme rays $S''_1$ reflecting at A pass through B where they are not deviated and end at C′. Consequently, all the incident rays included in angle $S'_1 AS''_1$ and reflecting at A pass between points C and C′.

In the same way, the rays included in angle $S''_2 A'S'_2$ are reflected at the other end A′ of the arc of parabola AA′ to penetrate in the secondary reflector 12 and terminate between points C and C′.

The concentration effected by the secondary CPC reflector is thus equal to the ratio: BB′/CC′.

In this embodiment, the receiver element 16, constituted by a cylindrical tube of rectangular section and of base CC′ inside which circulates a heat-transfer fluid, is disposed in contact with the downstream ends of the reflector 12.

In a variant embodiment of the invention, the receiver element 16 is constituted by an electric collector converting the solar energy into electrical energy.

However, in the case of thermal collectors, it is generally preferred to use cylindrical tubes with circular base, by reason, on the one hand, of their interesting surface/volume ratio which represents the best compromise from the standpoint of heat losses, and, on the other hand, of their ease of supply.

Figure 2:
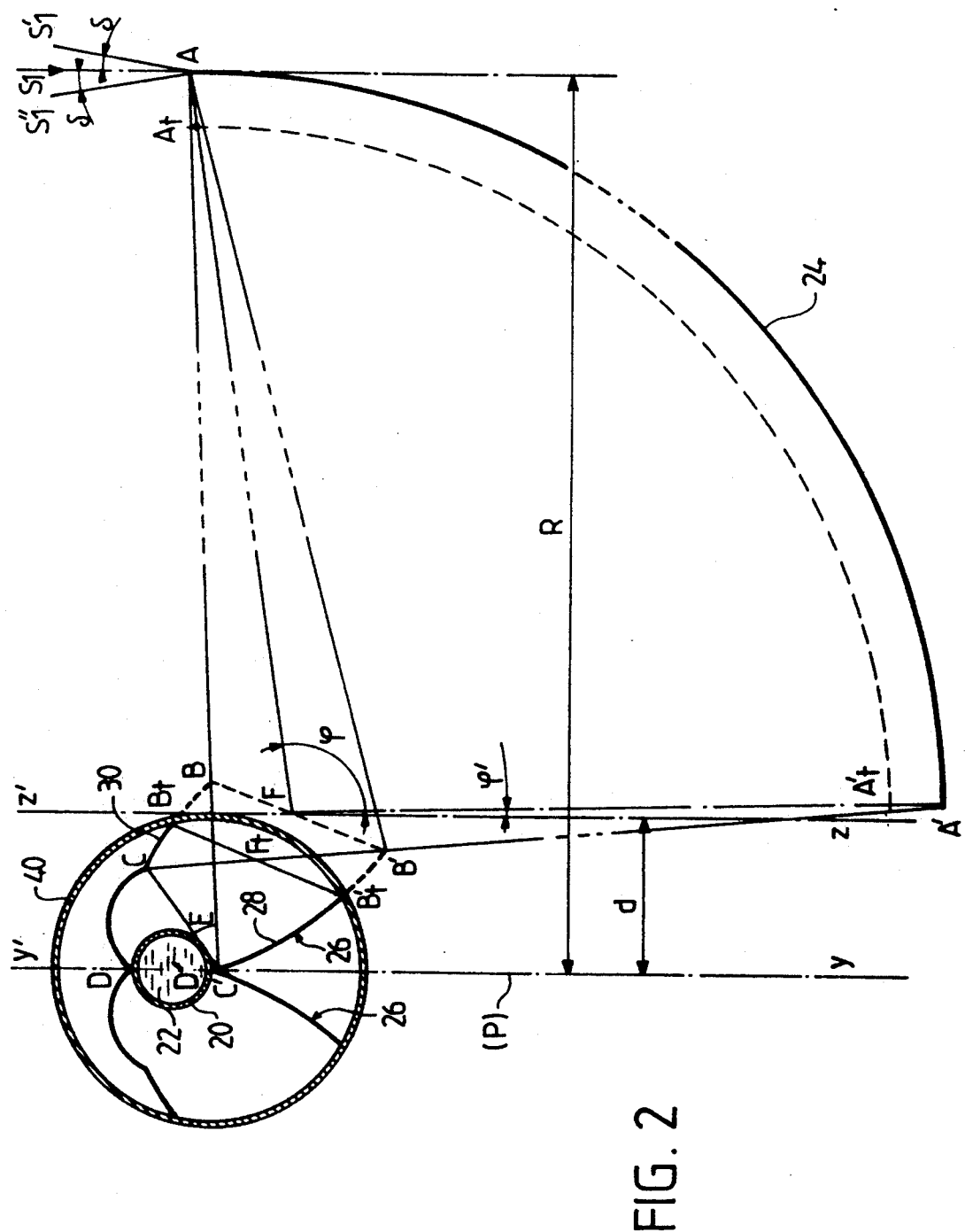
FIG. 2 is a half-view in vertical and transverse section of a concentrator according to the invention employing a cylindrical receiver element with circular base.

FIG. 2 shows a half-concentrator provided with a receiver element constituted by a cylindrical tube 20 with circular base, in which a heat-transfer fluid 22 circulates. The concentrator, of which only the right-hand part has been shown for the reasons of symmetry specified hereinbefore, comprises two cylindrical reflectors with generatrices parallel to those of the receiver tube 20, namely a principal reflector 24, whose base is constituted by an arc of parabola AA' of focus F and with axis zz' parallel to the axis of symmetry yy' of the concentrator and which is offset with respect thereto by a quantity d, and a secondary reflector 26 constituted by two reflector elements 28 and 30 facing each other and whose bases are respectively constituted by two arcs BCD and B'C'D'.

Each of these two arcs is constituted by an arc of ellipse, BC and B'C' respectively, defining, as before, two segments, namely an upstream segment BB' and a downstream segment CC'. Each of the arcs of ellipse is followed by an arc of involute of circle, CD and C'D' respectively. The secondary reflector 26 is disposed so that the segment CC' is tangential, at E, to the circle constituting the base of the exchanger tube 20.

As before, all the sun's rays making angles $\delta$ on either side of their principal direction yy' are therefore concentrated on a rectangular surface of which one side is constituted by the generatrix of the cylinder constituting the secondary reflector 26 and the other side by the downstream segment CC'. This surface therefore performs the role of virtual object with respect to the rest of the reflector, namely the surface whose base is constituted by two arcs of involute of circle, respectively CD and C'D'. The second part of the reflector of type CPC, due to the shape of its base in the form of an involute of circle, does not change the concentration since, by definition, the surface, of which the base is CC', and which performs the role of virtual object, is equal to that of the semi-cylinder having for base the semi-circle DD'.

By geometrical definition of the involute of circle, all the light rays issuing from the surface of which the base is EC will attain the portion ED of the receiver element 20 either directly, or after reflection on the reflector of base CD. Similarly, the incident rays issuing from the surface of which the base is EC' will attain the portion of the receiver element 20 of base ED' either directly or after reflection on the arc of involute of circle C'D'.

The total concentration obtained by a concentrator according to the present embodiment is of the order of 68% of the theoretical limit $C_{max}$ determined previously.

The concentrator according to the invention is principally determined by two angles, namely angles $\phi'$ and $\phi$, i.e. the angles formed respectively by the straight line joining the focus F of the arc of parabola AA' to point A' and to point A of this arc with axis zz' of the parabola. The ratio of the concentration furnished by the concentrator according to the invention with respect to the theoretical maximum concentration $C_{max}$ is expressed by the relation:

$$\frac{C}{C_{max}} = \frac{\cos\left(\frac{\phi - \phi'}{2}\right)\left[\cos\left(\frac{\phi + \phi'}{2}\right) + \cos\left(\frac{\phi - \phi'}{2}\right)\right]}{\left[1 + \cos\left(\frac{\phi + \phi'}{2}\right)\cos\left(\frac{\phi - \phi'}{2}\right)\right]} = \frac{AA'/CC'}{C_{max}}$$

Figure 3:
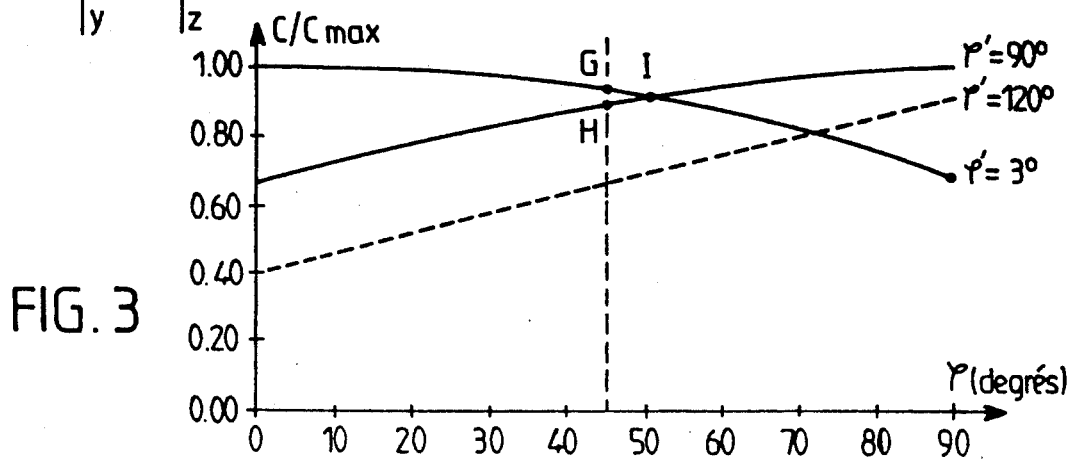
FIG. 3 is a graph representing the ratio of the concentration furnished by a concentrator according to the invention with respect to the theoretical maximum concentration $C_{max}$ as a function of the angle of aperture of the parabolic reflector and the angle formed by the axis of the parabola with the straight line joining the focus of the latter to the beginning of the arc of parabola.

FIG. 3 represents this equation in the form of a chart, plotting on the y-axis the ratio of the concentration furnished by a concentrator, as a function of the angle of aperture $\phi$ of the concentrator, for different values of angle $\phi'$ namely 3°, 90° and 120°. It is thus ascertained on this graph that, in the case of the embodiment shown in FIG. 2, for a value of $\phi = 90°$ and $\phi' = 3°$, the ratio of the concentration of the present concentrator with respect to the theoretical maximum value Cmax is about 68%.

In order to reduce bulk as well as the cost of manufacturing the concentrator, the secondary reflector 26 may be truncated as shown in FIG. 2. Experience has shown that, by dividing the length of the latter by two, the concentration furnished by the concentrator decreases only by about 10%. In this way, in practice, the secondary reflector 26 is therefore defined by arcs $DCB_t$ and $D'\ C'\ B'_t$. Insofar as the segment BB' undergoes a translation in the direction of the receiver element 20, the arc of parabola AA' is also displaced, by the same quantity, thus coming to $A_t A'_t$ so that the focus thereof lies at $F_t$ substantially in the middle of segment $B_t B'_t$.

So as to minimize the heat losses undergone by the concentrator, the receiver element 20 as well as the secondary reflector 26 are enclosed inside a cylindrical glass envelope 40, in vacuo, of which the generatrices are parallel to those of the receiver element 20.

The diameter of the glass envelope 40 is of the order of four to five times the diameter of the receiver element 20 and thus, in the present embodiment, for a diameter of the receiver element of the order of 2.5 cm, a glass envelope with a diameter of 11 cm is used, to which corresponds a principal reflector 24 of radius R of about 5 meters.

Figures 4, 5:
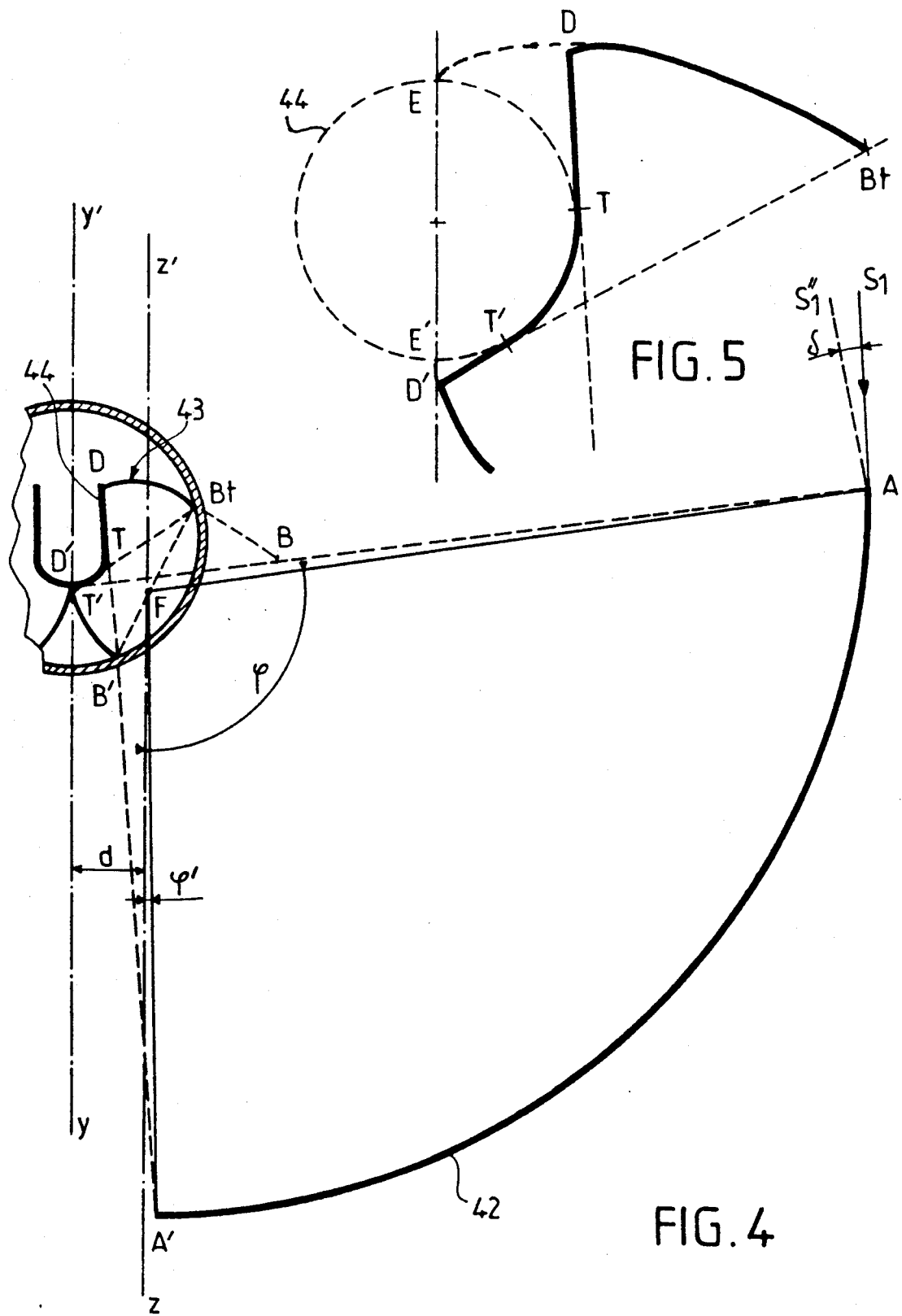
FIG. 4 is a half-view in vertical and transverse section of a variant embodiment of a concentrator according to the invention.
FIG. 5 is a partial view of FIG. 4 on an enlarged scale.

In the variant embodiment shown in FIGS. 4 and 5, a half-concentrator according to the invention is composed of a cylindrical principal reflector 42 of which the base is constituted, as before, by an arc of parabola AA' and a secondary reflector 43. The base of the latter is constituted by two arcs of generalized involute of circle, facing each other, respectively BD and B'D', whose respective foci are constituted by the ends A' and A of the arc of parabola AA'. The receiver element is constituted by a photovoltaic cell 44 whose base is constituted by an arc of circle TT' (belonging to the circle from which are constructed the generalized involutes BD and B'D') and by two segments of straight line TD and T'D' tangential to said circle and passing respectively through the lower (A') and upper (A) ends of the arc of parabola AA'. So as to avoid the upper part of the reflector of base BD preventing the rays $S_1$, reflecting at A at an incidence $S''_1$ offset by an angle $\delta$ towards the interior of the principal reflector, from penetrating in the secondary reflector, the latter must be truncated so that its base becomes $B_t D$.

Under these conditions, and as previously, segment $B_t B'$ performs the role of virtual object with respect to the two generalized involutes of circle $B_t D$ and B'D' and the rays arriving at the respective end points B' and $B_t$ of the segment $B'D_t$ and coming from the respective foci A and A' of the generalized involutes of circle arrive tangentially to the respective walls TD and T'D' of the absorber according to the very principle of construction of the generalized involute, as set forth hereinbefore. The other rays will therefore be either absorbed directly or after reflection by the absorber 44.

In a variant of the present embodiment, a receiver element 44 may, of course, be used whose base is of circular form. In that case, it would be suitable to extend each of the arcs of generalized involute of circle $B_t$ D and B'D' by arcs of involute of circle DE, D'E' respectively joining points D and D' to points E and E', intersections of the receiver element 44 with the axis of symmetry yy' of concentration, as shown in dotted lines in FIG. 5. Such an embodiment is particularly interesting from the point of view of manufacture of the secondary reflector by reason of the continuity of the curvature thereof.

Figure 6:
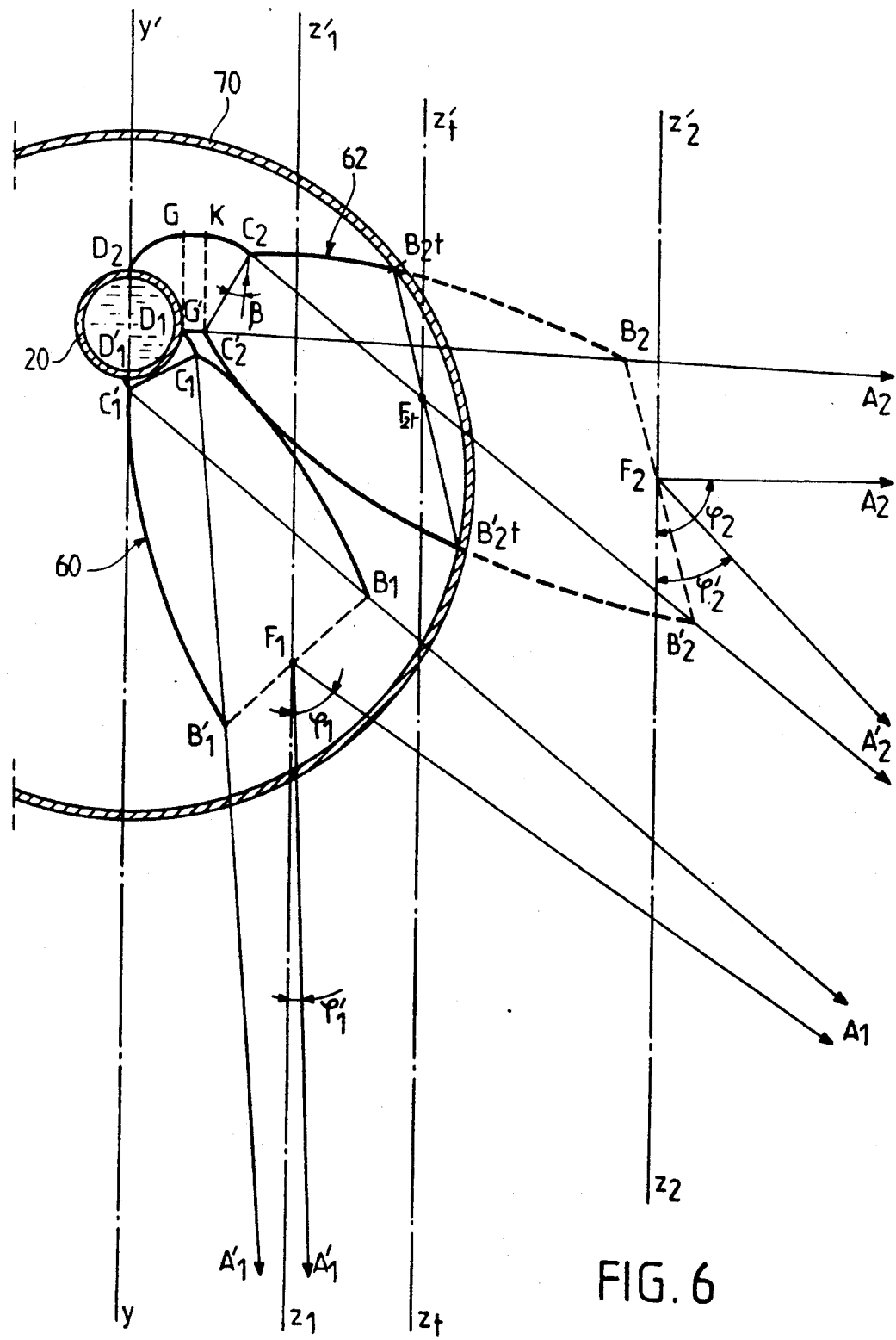
FIGS. 6 and 7 are views, in vertical and transverse section, of a concentrator according to the invention, composed of two concentrator elements.
Figure 7:
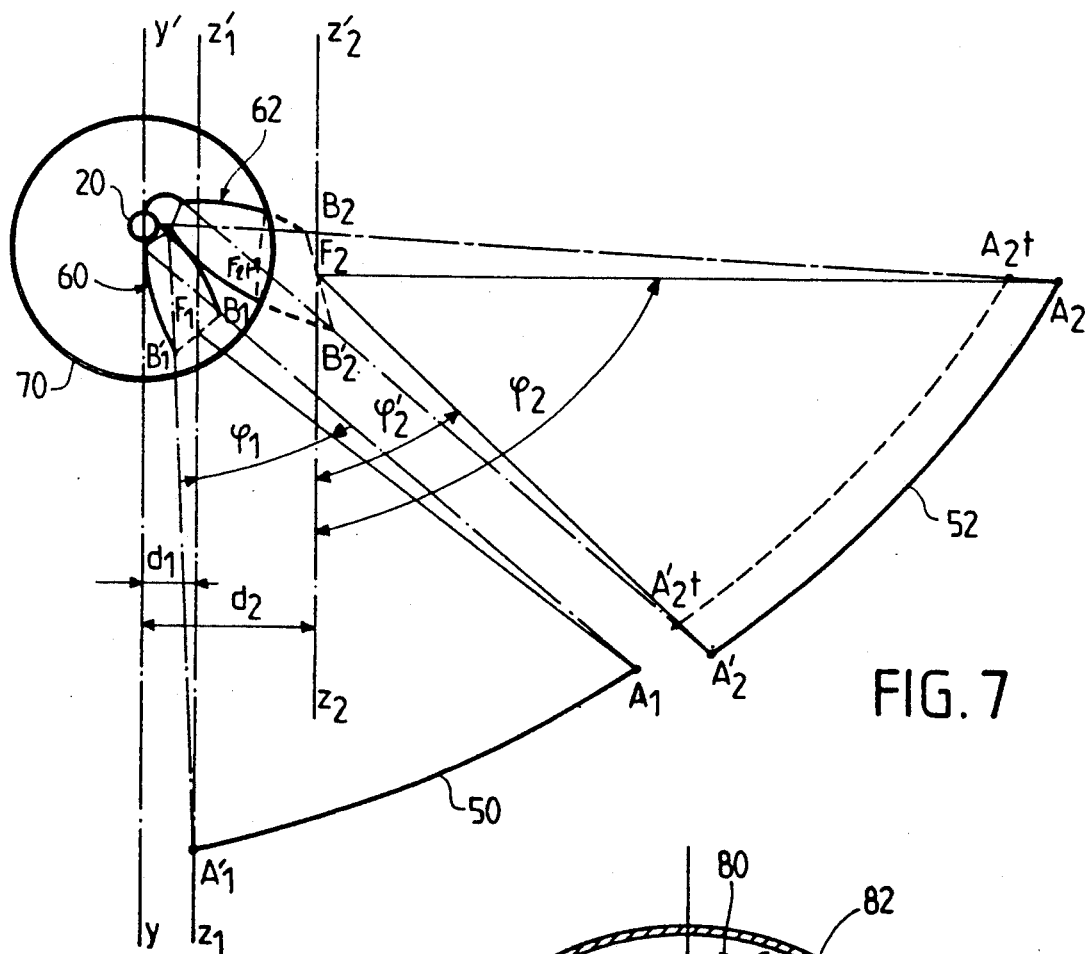

The concentrator according to the invention may also be constituted, as shown in FIGS. 6 and 7, by four concentrator elements of the type such as described previously, symmetrical in two's with respect to the plane of symmetry P containing the axis yy'. For the same reasons of symmetry as before, only one half of the concentrator will be described hereinafter.

Each of the half-concentrators is constituted by a cylindrical principal reflector of which the base is an arc of parabola, 50 and 52 respectively, with which is associated a cylindrical secondary reflector of type "CPC", 60 and 62 respectively.

The principal reflector 50 of the first concentrator element is thus composed of a cylinder whose base is an arc of parabola $A'_1 A_1$, of axis $z_1z'_1$, of which the focus $F_1$ is offset by a distance $d_1$ from the axis of symmetry yy' of the concentrator and whose segments $F_1 A'_1$ and F1 A1 respectively form angles $\phi'_1$ of 3° and $\phi_1$ and 45° with axis $z_1z'_1$ of the arc of parabola $A'_1A_1$.

The secondary reflector 60 of this first concentrator element is itself constituted by a cylindrical reflector of the type described previously, of which the base is constituted by two arcs of ellipse $B'_1C'_1$ and $B_1C_1$ respectively extended by two arcs of involute of circle $C'_1D'_1$ and $C_1D_1$ respectively.

Referring to the curve of FIG. 3, it is ascertained that point G thereof, which characterizes this first concentrator element, corresponding to a relative concentration of about 93%.

The principal reflector 52 of the second concentrator element is also composed of a cylinder whose base is an arc of parabola $A'_2A_2$ of axis $z_2z'_2$, of which the focus $F_2$ is offset by a distance $d_2$ from the axis of symmetry yy' of the concentrator and whose segments $F_2A'_2$ and $F_2A_2$ respectively form angles $\phi_2'=$ to angle $\phi 1$ of the first concentrator element, viz. a value of 45°, and $\phi_2$ of 90°.

The secondary reflector 62 of this second concentrator element is itself constituted by a cylindrical reflector of the type described previously, whose base is constituted by two arcs of ellipse $B'_2C'_2$ and B2C2.

Segment $C_2C'_2$ joining the downstream ends $C_2$ and $C'_2$ of the secondary reflector 62 not being in contact with the circle constituting the base of the receiver element 20, wall elements $C'_2 D_1$ and $C_2KGD_2$ are used for "transporting" the virtual object whose base is constituted by the segment C2 C'2 up to a segment GG' (in dotted lines) tangential to the circle constituting the base of tube 20. These wall elements are constituted by a straight line $C'_2 D_1$ and by a complex curve, i.e. composed of three arcs comprising successively an arc of circle $C_2K$, centered at $C'_2$ and of radius equal to segment $C'_2C_2$, a segment of straight line KG parallel to segment $C'_2 D_1$ and an arc of involute of circle GD2.

As shown in FIG. 6 and as explained in the preceding embodiment illustrated in FIG. 2, the rays coming from the sun and parallel to axis yy' of the concentrator as well as the rays offset on either side of this axis by an angle $\delta$, pass through segment $C_2 C'_2$.

Arc $C_2K$ being constituted by an arc of circle of radius $C_2C'_2$, it will be understood that all the rays traversing segment $C_2C'_2$ and striking arc $C_2K$ are reflected towards the interior of the latter and consequently pass through segment $C'_2K$. The latter then behaves with respect to the system as a virtual object. In the same way, all the light rays traversing segment $C'_2$ K either traverse directly, or are reflected on the segments KG or $C'_2D_1$ and therefore traverse segment G'G. This latter segment then behaves as a virtual object with respect to the sequence of the reflector, and one has consequently returned to the case of the preceding Figure and the arcs of involute of circle GD2 and G'D1 will transmit, without supplementary concentration, all the rays traversing segment GG' to the surface of cylinder $D_1D_2$.

The graph of FIG. 3 furnishes the relative concentration of this second concentrator element which, for reasons of symmetry of angles $\phi$ and $\phi'$ in formula (2) is characterized by point H which corresponds to angles $\phi_2'=45°$ and $\phi_2=90°$. This relative concentration is thus close to 90%.

It is demonstrated that the overall concentration of the concentrator is maximum when the concentrations furnished by the two concentrator elements are equal and the two points G and H of FIG. 6 consequently merge at point I. At this point I, each concentrator element, as well as the concentrator in its entirety, present a ratio of concentration of 90% for angles $\phi_1'$ of 3°, $\phi_1=\phi'_2=50°$ and $\phi_2=90°$.

As before, for reasons of cost and bulk, the secondary reflector 62 of the second concentrator element is truncated so that its upstream ends $B_2$ and $B'_2$ come respectively to $B_{2t}$ and $B'_{2t}$. As shown in FIG. 7, the arc of parabola $A'_2A_2$ and its focus $F_2$ are displaced by the same quantity and come respectively to $F_{2t}$ and $A'_{2t}A_{2t}$.

In order to minimize the heat losses, the concentrator is disposed in a cylindrical glass tube 70 with generatrices parallel to the generatrices of the reflectors and the heat receiver element 20, this tube being placed in vacuo.

The concentration of such a concentrator is increased, with respect to the preceding embodiment, in noteworthy manner since, as shown previously, its power of concentration with respect to the theoretical maximum concentration is of the order of 90%.

Figure 8:
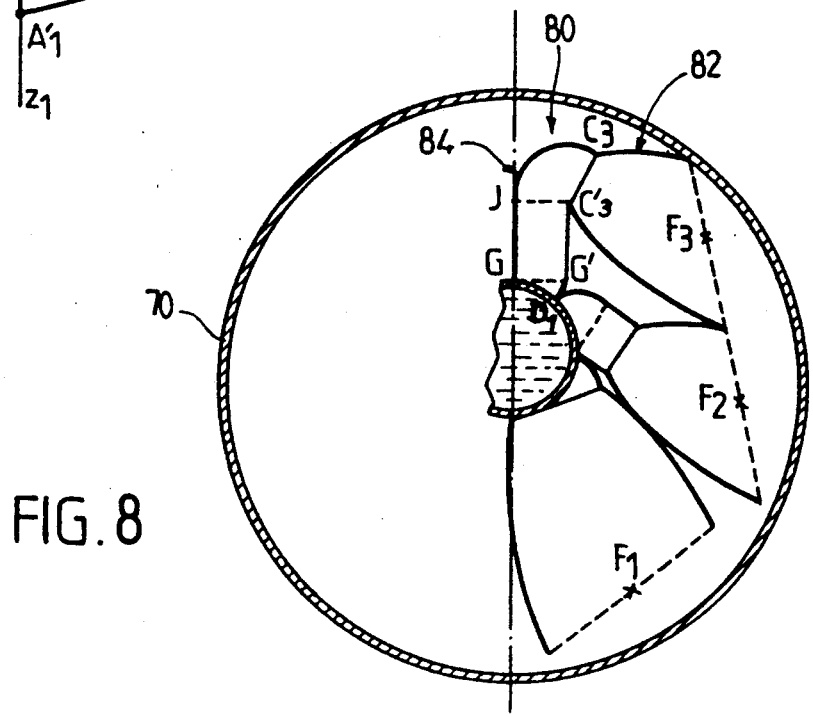
FIG. 8 is a view in detail, in vertical and transverse section, of a concentrator according to the invention composed of three concentrator elements of the type shown in FIG. 2.

Of course, and as shown schematically in FIG. 8, one or more supplementary concentrator elements may be employed in order to reduce the volume occupied by the secondary reflectors and thus the diameter of the glass tube and therefore the cost thereof.

In FIG. 8, a third concentrator element is used, and the three primary reflectors which are constituted as before, have not been shown.

The secondary reflector 80 of this third concentrator element is thus composed of a first part whose base is in the form of an arc of ellipse, as seen previously, and a second complex part 84 whose base is constituted by an arc of circle $C_3 J$ centered at $C'_3$ and of rays $C'_3C_3$ terminating at a segment $J_3C'_3$ through which pass all the through rays $C_3C'_3$ and which performs the role of virtual object with respect to the sequence of the reflector. The base of the reflector 84 continues in two segments of straight line JG and $C'_3G'$ terminating at a segment GG' through which pass all the through rays $JC'_3$, and which behaves as a virtual object with respect to the sequence of the reflector. The base of the reflector 84 terminates in an arc of involute of circle $G'D_1$ with the result that one thus returns to the preceding problem, and all the rays traversing segment $C_3C'_3$ strike the arc of circle $GG'$ of the receiver element 20. This arrangement makes it possible to employ less voluminous secondary reflectors, since the secondary reflectors of the second and third concentrator elements are smaller than what a single secondary reflector performing the same function would be.

I claim:

1. Concentrator device intended for effecting concentration of substantially parallel radiations on a receiver element comprising cylindrical elements symmetrical with respect to a plane P of the same direction as the radiations, further comprising, on each side of the plane of symmetry P, at least one concentrator element, each concentrator element comprising a principal cylindrical reflector whose base is constituted by an arc of parabola $AA'$, of which the axis $zz'$ is parallel to the direction of the radiations and is offset by a distance d with respect to the plane of symmetry P on the side of the arc of parabola $A,A'$, and a secondary reflector, constituted by two cylindrical elements BCD, B'C'D', and whose base is constituted by at least one arc of generalized involute BC,B'C', whose concavities face each other, each of these arcs terminating in an upstream end B,B' determining a segment of straight line BB' on which is positioned the focus F of the arc of parabola AA' constituting the base of the principal reflector, and a downstream end C,C', the focus of each of the arcs of generalized involute BD and B'D' being respectively constituted by the end A',A of the arc of parabola AA' facing its concavity.

2. Concentrator device according to claim 1, characterized in that the base of each element of the secondary reflector is constituted by at least one arc BC,B'C' in ellipse form of which the foci C'A'; C,A are constituted on the one hand by the downstream end C';C of the other arc of ellipse B'C'; BC and by the intersection of the straight line CB'; C'B joining the downstream end C;C' of this arc of ellipse BC;B'C' to the upstream end B';B of the other arc of ellipse B'C';BC with the arc of parabola A'A.

3. Device according to claim 2, characterized in that the receiver element comprises a plane upstream face in contact with the downstream generatrices issuing from the downstream ends C, C' of the two elements BC, B'C' constituting the secondary reflector.

4. Device according to claim 3, characterized in that the receiver element is constituted by a cylindrical tube of rectangular section having a heat-transfer fluid passing therethrough.

5. Device according to claim 2, characterized in that the receiver element is constituted by an electrical collector.

6. Device according to claim 1, characterized in that the receiver element is constituted by a cylindrical tube of circular section, the elements constituting the secondary reflector having bases constituted by a generalized involute of circle BC, B'C' joined to the surface of the receiver element by at least one arc of involute of circle DE,D'E'.

7. Device according to claim 6, characterized in that the receiver element is tangential to a plane whose base is constituted by a segment CC' joining the downstream ends C,C' of the arcs of generalized involute of circle BC;B'C' and by the generatrices of the reflector issuing from these ends C,C'.

8. Device according to claim 1 characterized in that the angle $\phi'$, included between the axis $zz'$ issuing from the focus F of the arc of parabole A'A constituting the base of the principal reflector and the segment of straight line joining this focus F to the end A' of the arc of parabola AA' closest to the axis of symmetry $yy'$ of the concentrator, is included between 1° and 5°.

9. Device according to claim 1, characterized in that the angle $\phi$ included between the axis $zz'$ issuing from the focus F of the arc of parabola A'A constituting the base of the principal reflector and the segment of straight line joining this focus F to the end A of the arc of parabola AA' most remote from the axis of symmetry $yy'$ of the concentrator, is included between 30° and 120°.

10. Device according to claim 6, characterized in that it comprises four concentrator elements, symmetrical in two's, with respect to the plane of symmetry P of the concentrator, the arcs of generalized involute being constituted by arcs of ellipse $B'_1C'_1$, $B_1 C_1$, the secondary reflector of a first concentrator element being tangential to the plane of symmetry P of the concentrator device, and comprising two cylindrical parts with a base of involute of circle respectively joining the downstream ends $C'_1;C_1$ of the two arcs of ellipse $B'_1C'_1;B_1C_1$ respectively to the lower part $D'_1$ and substantially in the middle of the wall of the semi-circle of base of the receiver element or point of junction $D_1$, and a second concentrator element, disposed on the same side as the first with respect to the plane P, comprising two cylindrical reflectors of which the base is respectively constituted by two arcs of ellipse $B'_2C'_2;B_2C_2$ respectively extended by a segment of straight line $C'_2D_1$ joining the downstream end of the first arc of ellipse $B'_2C'_2$ to the point of junction $D_1$, and by an arc of involute of circle $D_2G$ issuing from the upper intersection $D_2$ of said circle with the axis of symmetry $yy'$ and terminating at the intersection of the latter with the tangent $G'G$ to said circle at the point of junction $D_l$ followed by a segment of straight line GK parallel and of length equal to said segment of straight line $C'_2D_1$ and an arc of circle $KC_2$ of radius equal to the segment $C'_2C_2$ joining the two downstream ends $C'_2$ and $C_2$.

11. Device according to claim 1 characterized in that said secondary reflector, is contained in a cylindrical tube transparent to the radiations and whose generatices are parallel to those of the reflectors.

12. Device according to claim 11, characterized in that the cylindrical tube is tight with respect to the atmosphere and is placed in vacuo.

* * * * *